(12) United States Patent
Wu et al.

(10) Patent No.: US 8,407,201 B2
(45) Date of Patent: Mar. 26, 2013

(54) DIGITAL IMAGE SEARCH AND RETRIEVAL SYSTEM

(75) Inventors: Peng Wu, San Jose, CA (US); Jonathan Yen, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1689 days.

(21) Appl. No.: 11/058,080

(22) Filed: Feb. 15, 2005

(65) Prior Publication Data

US 2006/0184574 A1  Aug. 17, 2006

(51) Int. Cl.
G06F 17/30 (2006.01)
(52) U.S. Cl. ...................................................... 707/707
(58) Field of Classification Search ............... 707/2, 102
See application file for complete search history.

(56) References Cited

U.S. PATENT DOCUMENTS

| | | | | |
|---|---|---|---|---|
| 5,832,499 | A * | 11/1998 | Gustman | 707/103 R |
| 5,983,237 | A * | 11/1999 | Jain et al. | 707/104.1 |
| 5,999,664 | A * | 12/1999 | Mahoney et al. | 382/305 |
| 6,564,202 | B1 * | 5/2003 | Schuetze et al. | 707/2 |
| 6,728,752 | B1 * | 4/2004 | Chen et al. | 709/203 |
| 2002/0069218 | A1 * | 6/2002 | Sull et al. | 707/501.1 |
| 2002/0140843 | A1 | 10/2002 | Tretter et al. | |
| 2004/0103111 | A1 * | 5/2004 | Miller et al. | 707/102 |
| 2006/0050993 | A1 * | 3/2006 | Stentiford | 382/305 |
| 2006/0080306 | A1 * | 4/2006 | Land et al. | 707/3 |

OTHER PUBLICATIONS

Barber, et al., "The QBIC project: Querying images by content using color, texture and shape," in Proc. SPIE Storage and Retrieval for Image and Video Databases, Feb. 1994.
Huang, et al., "Multimedia Analysis and Retrieval System (MARS) Project," Proc. 33rd. Annual Clinic Library Appl. of Data Processing-Digital Image Access and Retrieval, 1996.
Ma, et al., "NeTra: A Toolbox for Navigating Large Image Databases," Proc. IEEE Intl. Conf. Image Processing, vol. 1, 1997, pp. 568-571.
Smith, et al., "VisualSEEK: a fully automated content-based image query system," Proc. 4th ACM Int. Conf. Multimedia, Nov. 18-22, 1996, Boston, United States, pp. 87-98.
"Exchangeable Image File Format for Digital Cameras: Exif Version 2.2," Standard of Japan Electronics and Information Technology Industries Association (JEITA), Apr. 2002.
Osuna, et al., "Support Vector Machines: Training and Applications," Center for Biological and Computational Learning, M.I.T., CBCL Paper No. 144, Mar. 1997.
Multimedia Linking for Enhanced Browsing, Authoring and Sharing, HPL-2003-190, Sep. 2003.

* cited by examiner

Primary Examiner — Styling Yen

(57) ABSTRACT

A digital image search and retrieval system includes a query parser and a response composer. The query parser is configured to parse a query obtained from a client, the query including at least one metadata criterion, search a metadata database for one or more digital images satisfying the metadata criterion, and search a digital image database for the one or more digital images. The response composer is configured to compose a response including the one or more digital images from the digital image database and their corresponding metadata from the metadata database, and enable the client to render the response in accordance with one or more user preferences.

41 Claims, 6 Drawing Sheets

| File Name / Metadata | Shutter Speed | Focal Length | Aperture | ... |
|---|---|---|---|---|
| 1.jpg | 1/30 | 50 | 2.0 | ... |
| 2.jpg | 1/125 | 35 | 8.0 | ... |
| 3.jpg | 1 | 70 | 1.2 | ... |
| ... | ... | ... | ... | ... |

FIG. 2

DIGITAL IMAGE SEARCH AND RETRIEVAL SYSTEM

BACKGROUND

Digital photographers, scientific researchers, and other users of digital images often generate and store large repositories of digital image files that they wish to search for those images meeting certain criteria. For example, a reviewer writing a comparison test of different digital camera models may take dozens or hundreds of test shots with each of the digital camera models, and need to identify and organize those occurring under certain lighting conditions (e.g. bright sunlight, moonlight, etc.) to evaluate the comparative strengths of the cameras in such conditions.

Most existing systems allow users to search a repository by pre-defined classes. For example, digital images in a repository may be classified by scene types. Scene types may include, without limitation, landscape, portrait, close-ups, night scene, fast motion scene, back-lit scene, etc. Alternatively or in combination, classes can be determined by considering common attributes (e.g., operational conditions) associated with different sets of digital images then assigning names to identify the sets of digital images. In response to a search query identifying a class, existing systems generally retrieve and display a set of digital images that falls within that class.

The searchability provided by the existing systems is limited by the selection of pre-defined classes. That is, a user generally cannot search for images that have not been previously classified. In addition, responses provided by the existing system do not provide the mechanism or adequate information to allow a user to refine its searches.

Thus, a market exists for an improved digital image search and retrieval system that enables a user to perform more flexible searches.

SUMMARY

A digital image search and retrieval system includes a query parser and a response composer. The query parser is configured to parse a query obtained from a client, the query including at least one metadata criterion relating to a type of recorded metadata, search a metadata database for one or more digital images satisfying the metadata criterion, and search a digital image database for the one or more digital images. The response composer is configured to compose a response including the one or more digital images from the digital image database and their corresponding metadata from the metadata database, and enable the client to render the response in accordance with one or more user preferences.

An exemplary method for searching and retrieving digital images of an image library includes parsing a query obtained from a client, the query including at least one metadata criterion relating to a type of recorded metadata, searching a metadata database for one or more digital images satisfying the metadata criterion, searching a digital image database for the one or more images, composing a response including the one or more digital images and their corresponding metadata, and enabling the client to render the response in accordance with one or more user preferences.

Other embodiments and implementations are also described below.

BRIEF DESCRIPTION OF THE FIGURES

FIG. 2 illustrates an exemplary representation of a metadata database.

DETAILED DESCRIPTION

I. Overview

Exemplary digital image search and retrieval processes and systems are described herein.

Section II describes exemplary process and system for populating metadata and digital image databases searchable by a digital image search and retrieval system.

Section III describes exemplary process and system for querying and obtaining responses in the digital image search and retrieval system.

Section IV describes additional implementations and embodiments

Section V describes an exemplary operating environment.

Figure 1:
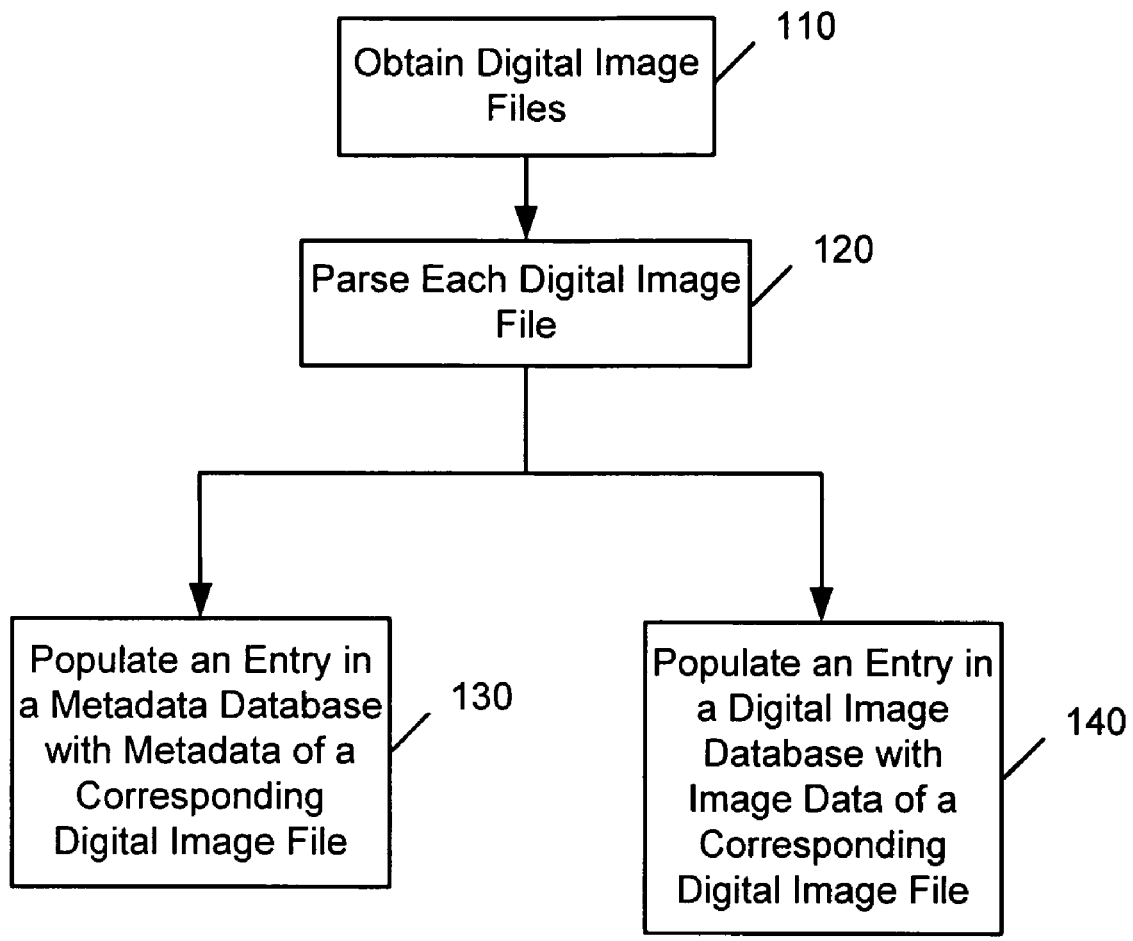
FIG. 1 illustrates an exemplary process for populating a digital image database and a metadata database.

II. Exemplary Process and System for Populating Databases in an Image Search and Retrieval System FIG. 1 illustrates an exemplary process for populating metadata and digital image databases accessible by a digital image search and retrieval system. An exemplary search and retrieval system will be described in more detail below with respect to FIG. 6. In general, the exemplary process of FIG. 1 can be applied to process a repository of digital image files stored in a storage media. The storage media may include any type of memory suitable for storing the files, for example and without limitation: (i) a memory card in a camera (e.g., if the process is implemented in a digital camera); (ii) a hard disk (e.g., if the process is implemented in a computing device); (iii) a CD-ROM or tape cartridge (e.g., if the process is implemented to read data stored on a removable memory); or (iv) still other forms of data storage media now known or hereafter created.

At step 110, a plurality of digital image files is obtained from a storage media of a repository of digital image files. In general, a digital image file includes a header followed by image data. The header typically includes data related to the image data (i.e., metadata). The metadata may include data specific to the operational conditions during the capture of the corresponding digital image by an image capture device. The metadata may have been recorded by the image capture device while capturing the image, later derived by image processing routines based on corresponding digital images, and/or user-specified.

Exemplary metadata recorded while capturing the image may include, without limitation: (i) shutter speed; (ii) aperture; (iii) lens focal length; (iv) flash operation; (v) redeye correction; (vi) white balance; (vii) automatic gain setting; (viii) date; (ix) time; (x) resolution/image size (e.g., 640×480 vs. 1024×768 vs. 1600×1200); (xi) degree of compression (e.g., low vs. medium vs. high); (xii) file format (e.g., JPEG vs. GIF vs. TIFF vs. RAW formats); (xiii) shooting mode (e.g., aperture-priority vs. shutter-priority vs. manual control); (xiv) light metering mode (e.g., center spot vs. weighted vs. evaluative); (xv) special effects (e.g., black & white vs.

vivid vs. neutral vs. sepia); (xvi) the name of the image capture device; and (xvii) virtually any other form of metadata that can be recorded by the image capture device. For ease of explanation, metadata recorded while capturing a digital image with a digital image capture device will be referred to as "recorded metadata." The recorded metadata are generally stored in a format specified by the manufacturer of the image capture device (e.g., a HP digital camera, a HP image scanner, etc.) and/or in accordance with the standard applicable to the particular type of image file (e.g., EXIF, JPEG, GIF, TIFF, PDF, etc.).

Metadata may also be derived (e.g., calculated, determined, etc.) based on corresponding digital images. For ease of explanation, this type of metadata will be referred to as "derived metadata." Exemplary derived metadata that can be determined based on corresponding digital images may include, without limitation: (i) maximum, minimum, and/or average intensities of the pixels recorded in the image; (ii) whether the image was taken during daytime vs. night conditions (e.g., via assessments of factors such as shutter speed, aperture, pixel saturation, the prevalence of dark pixels, etc.); (iii) whether the image is overexposed or underexposed; (iv) whether the image was taken under natural or artificial lighting (e.g., via estimation of color balance); (v) a determination of scene type (e.g., landscapes are typically taken using 35 mm or smaller focal length settings, while portraits are typically taken using 85 mm focal length settings); and (vi) virtually any other form of metadata that can be calculated from the image data (possibly in combination with recorded metadata).

User-specified metadata will be described in more detail in Section IV below.

At step 120, each digital image file is parsed to separate the recorded metadata from the image data.

At step 130, an entry in a metadata database is populated with the metadata (i.e., recorded, derived, and user-specified metadata) for a corresponding digital image. In an exemplary implementation, in each entry, values for each type of metadata (e.g., aperture, shutter speed, etc.) corresponding to each digital image are stored in corresponding fields for that entry. Each metadata entry can be identified by its corresponding digital image file name. An exemplary representation of a metadata database, illustrated in FIG. 2, will be described in more detail below.

At step 140, an entry in a digital image database is populated with the image data corresponding to each image. In an exemplary implementation, image data can be identified by their corresponding digital image file name (e.g., 1.jpg). In another exemplary implementation, the source image database may itself serve as the digital image database. Thus, a new digital image database may be created if needed; else the source image database may be used instead.

The processes illustrated above are merely exemplary. Those skilled in the art will appreciate that other processes and/or steps may be used to populate the metadata and digital image databases in accordance with the requirements of a particular implementation.

FIG. 2 illustrates an exemplary representation of a metadata database. In FIG. 2, metadata relating to each digital image file are identified by their corresponding digital image file names (e.g., 1.jpg, 2.jpg, 3.jpg, etc.). For each digital image file, various types of metadata are specified (e.g., shutter speed, focal length, aperture, etc.) and their corresponding values are stored. In this way, the values of different types of metadata relating to each digital image can be easily accessed from the database.

Figure 3:
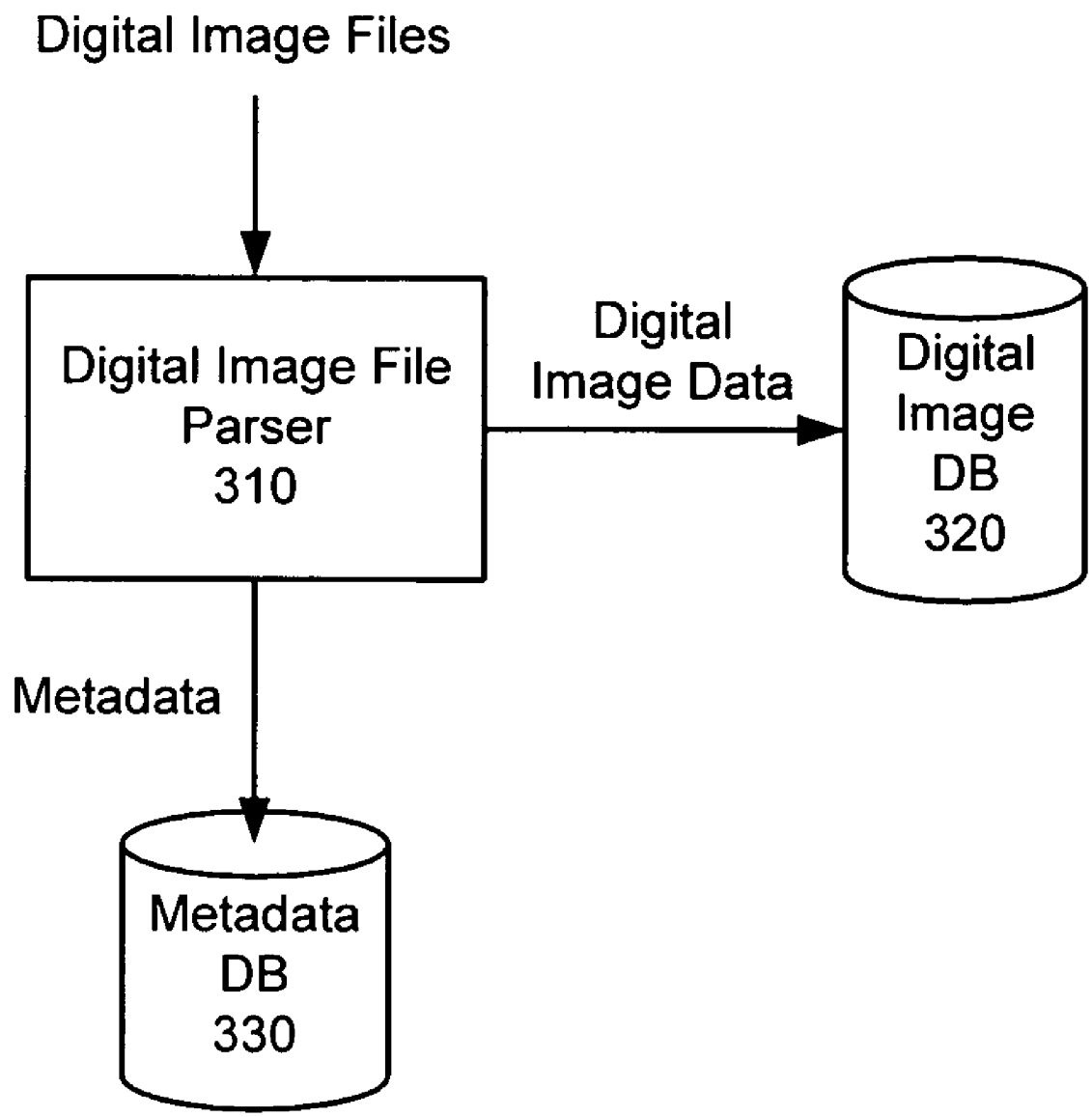
FIG. 3 illustrates an exemplary system for performing the exemplary process of FIG. 1.

FIG. 3 illustrates an exemplary system that can be implemented to perform the process of FIG. 1. The system 300 includes a digital image file parser 310 for parsing digital image files received from a memory (not shown). The digital image file parser 310 separates metadata and image data in each digital image file and stores the data in the metadata database 330, and digital image database 320 (if needed), respectively. In an exemplary implementation, metadata are archived in accordance with an entity-relation based schema (e.g., an EXIF metadata schema) developed in accordance with a known (or future-developed) database standard (e.g., SQL, OODB, etc.). Many exemplary implementations of SQL (and other) database software are widely available; thus, they need not be described in greater detail herein.

Section III describes an exemplary process for accessing the metadata and digital image databases 330 and 320 in a search and retrieval process.

Figure 4:
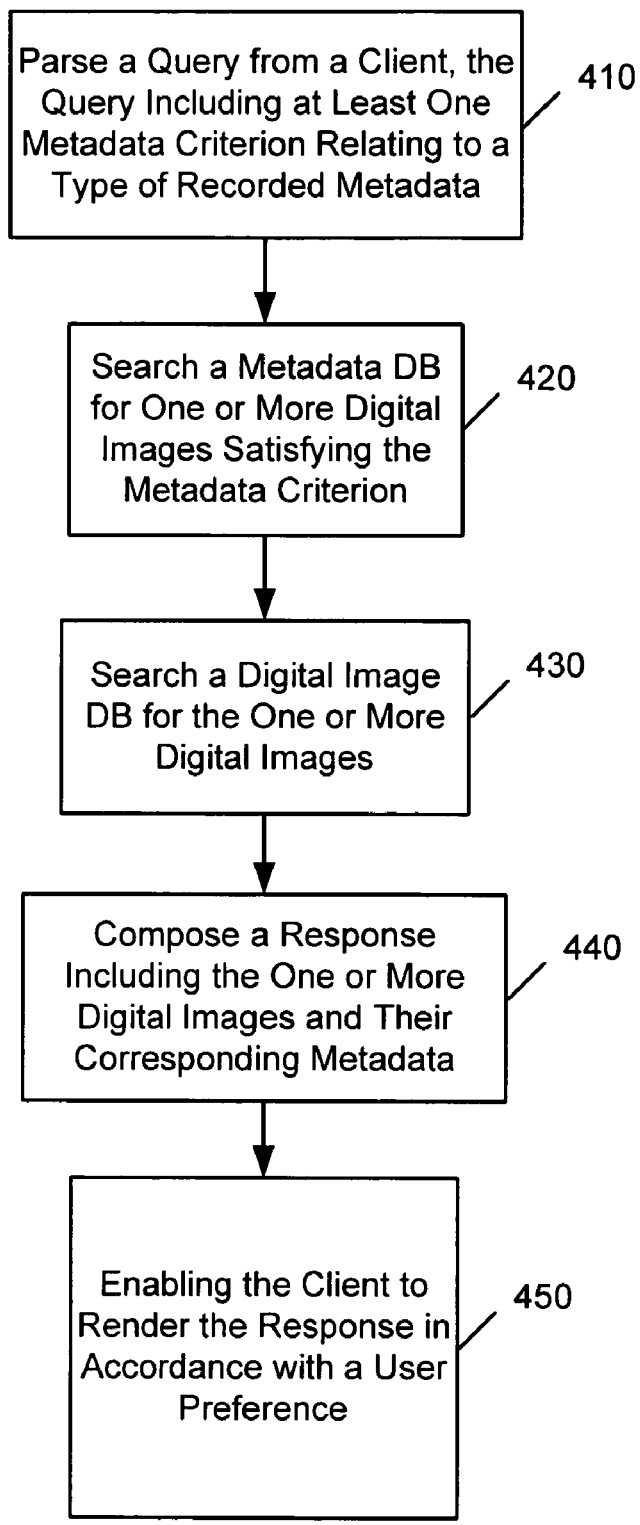
FIG. 4 illustrates an exemplary server-side process for processing queries from a client.

III. Exemplary Processes and System for Querying and Obtaining Responses from an Image Retrieval System FIG. 4 illustrates an exemplary process for responding to a client query to search and retrieve digital images and their metadata.

At step 410, a query from a client is parsed. In an exemplary implementation, the query includes at least one metadata criterion (i.e., metadata type and its corresponding value) relating to a type of recorded metadata (e.g., shutter speed <0.5 sec).

At step 420, a metadata database (e.g., metadata database 330) is searched for one or more digital images satisfying the desired metadata criterion. For example, the query might be for all digital images having a shutter speed less than 0.5 seconds. If the metadata database is as illustrated in FIG. 2, then images 1.jpg and 2.jpg satisfy the metadata criterion specified in the query.

At step 430, an image database (e.g., digital image database 320) is searched for the image data of the one or more digital images determined at step 420. In an exemplary implementation, an indexing scheme based on the file names of the one or more digital images is used for retrieving the corresponding image data from the image database.

At step 440, a response is composed to include the image data of the one or more digital images satisfying the query and their corresponding metadata values. For example, the response may include the image data for 1.jpg and shutter speed=$\frac{1}{30}$ second, focal length=50 mm, aperture=f/2.0, etc. and image data for 2.jpg and shutter speed=$\frac{1}{125}$ second, focal length=35 mm, aperture=f/8.0, etc. The foregoing example includes additional metadata types and values in addition to the specific criterion specified in the query; these may (or may not) be included in the response to enable the user to make better follow-up searches. Further, the response may also include corresponding metadata other than recorded metadata (e.g., derived metadata, user-specified metadata, etc.). In other implementations, the response may alternatively include less metadata types than specified in the query. In general, the number of metadata types to be included in a response can be indicated by the user, for example, in the query.

At step 450, the response may be transmitted to the client and the client is enabled to render the response in accordance with one or more user preferences. For example, the user can view any portion of the response as desired (e.g., any combination of the digital images and their corresponding metadata, i.e., more or less metadata types than what is included in the response, etc.).

The processes illustrated above are merely exemplary. Those skilled in the art will appreciate that other processes and/or steps may be used to respond to a client query in accordance with the requirements of a particular implementation.

Figure 5:
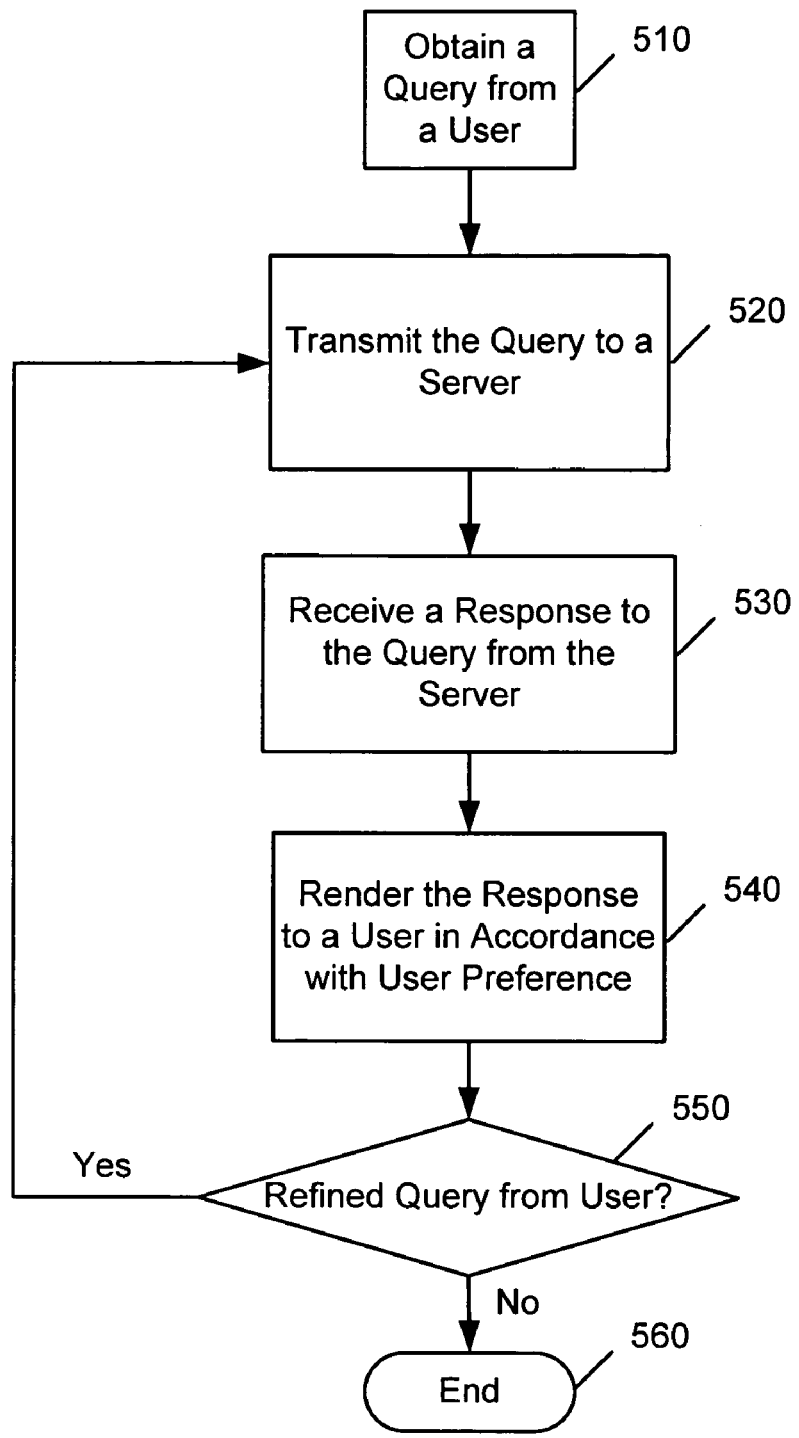
FIG. 5 illustrates an exemplary client-side process for composing queries and processing responses from a server.

FIG. 5 illustrates an exemplary process for sending a query to search and retrieve digital images and their corresponding metadata and processing a response to the query.

At step 510, a client computer obtains a query composed by a user. In an exemplary implementation, the query is composed in accordance with the database language (e.g., SQL) implemented to set up the database (and a server supporting the database) to be queried. A relational database language, such as SQL, defines how to set up the database and what types of queries can be executed on the database. In general, Boolean queries are readily accommodated by most relational database languages. For example, an exemplary Boolean query might be: "Aperture <f/4.0 and Focal Length >50 mm." One skilled in the art will recognize that other database technologies may alternatively be implemented. For example, an object oriented database and server may be implemented to support object oriented type queries.

At step 520, the query is transmitted to a server. In an exemplary implementation, the server is an SQL server (i.e., implemented in accordance with SQL standard) or is otherwise capable of parsing and responding to the particular type query received.

At step 530, a response to the query is received from the server. In an exemplary implementation, the response includes image data for a set of images and their corresponding metadata (e.g., metadata types and their corresponding values).

At step 540, the response is rendered to the user. In an exemplary implementation, digital images and their corresponding metadata are displayed on a computer monitor. The returned metadata for each digital image may include more or less metadata types and values than specified in the query (e.g., as indicated by the user). For example, if the exemplary query at step 510 above is made to search the exemplary metadata database illustrated in FIG. 2, the resulting response will include the digital image of 3.jpg and the following metadata: shutter speed=1 sec; focal length=70 mm; aperture=f/1.2. Further, any portion of the response may be displayed depending on user preferences. For example, a user interface may be implemented to dynamically obtain indications from the user regarding which portions of the response to display. Alternatively, a user may pre-program its display preferences at any time prior to the rendering of the response.

At step 550, the client computer determines if the user has refined the original query (or has composed a new query). In an exemplary implementation, the user may refine its original query to include more metadata types and/or different metadata values to obtain more or less hits. If another query is obtained from the user, the process repeats at step 520. Otherwise, the process ends at step 560.

The processes illustrated above are merely exemplary. Those skilled in the art will appreciate that other processes and/or steps may be used to compose a query and process a response to the query in accordance with the requirements of a particular implementation.

By providing corresponding metadata in addition to digital images that satisfy the query, a user is enabled to improve its searches, for example, by adjusting one or both of metadata types and metadata values in the next query.

Figure 6:
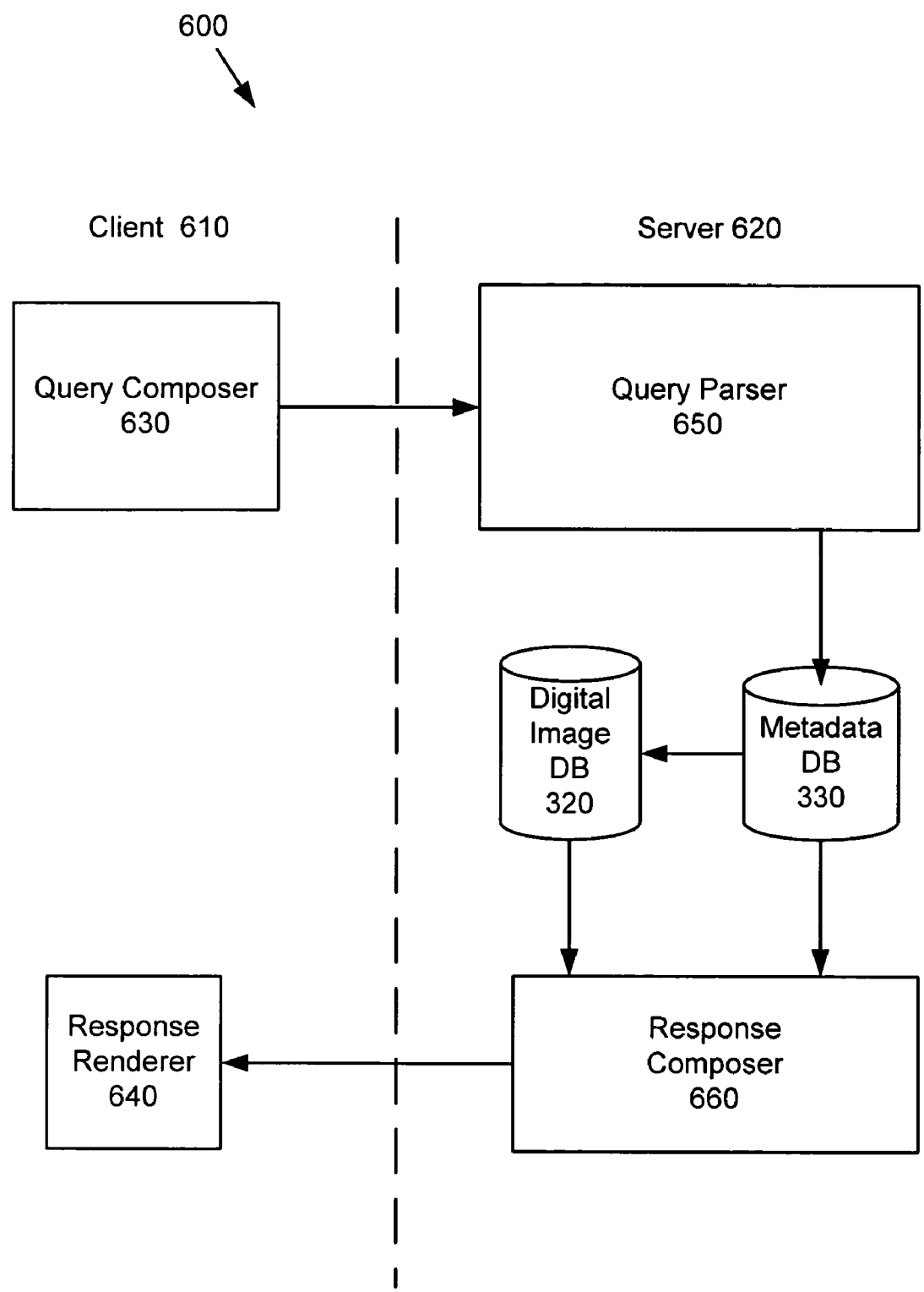
FIG. 6 illustrates an exemplary search and retrieval system for performing the exemplary processes of FIGS. 4 and 5.

FIG. 6 illustrates an exemplary search and retrieval system 600 for performing the processes illustrated in FIGS. 4 and 5.

An exemplary client 610 includes a query composer module 630 and a response renderer module 640. In an exemplary implementation, the query composer module 630 includes a user interface (not shown) for receiving user input via an input device (e.g., keyboard, mouse, joystick, stylus, microphone, etc.). The query composer module 630 composes a query by conforming the user input to a database standard (e.g., SQL) and sends the query to the server 620.

An exemplary server 620 is set up in accordance with a database standard (e.g., SQL) and includes a query parser module 650, the digital image database 320, the metadata database 330, and a response composer module 660. In another exemplary implementation, the databases 320 and 330 need not reside on the server 620 but may be otherwise accessible to the server 620 (e.g., via a network).

The query parser module 650 receives a query from the client 610 and parses the query in accordance with the implemented database standard (e.g., SQL). In an exemplary implementation, the query parser module 650 determines the metadata criteria (e.g., metadata type(s) and corresponding value(s)) in a query and accesses the metadata database 330 to find one or more digital images satisfying the query.

The metadata corresponding to the one or more digital images satisfying the query, if any, are retrieved from the metadata database 330 and the digital image data of the one or more digital images are retrieved from the digital image database 320 and sent to the response composer module 660.

The response composer module 660 composes a response to the query including the image data of one or more digital images satisfying the query and their corresponding metadata. The response composer module 660 then may transmit the response to the client 610.

At the client 610, the response renderer module 640 receives the response from the server 620 and renders the response to the user. In an exemplary implementation, the response renderer module 640 includes a user output interface (not shown) for rendering the response. For example, the user output interface can output the digital images and their corresponding metadata to the user via a computer monitor.

IV. Additional Implementations and Embodiments

This section describes other implementations and embodiments that may be implemented in addition to the exemplary embodiment described in Sections II and III above.

A. User-Specified Metadata

Metadata can also be arbitrarily user-specified after viewing images from the image retrieval system. For example, a user might wish to pick out images of family members, colleagues, sports scenes, trip photos, or any other type of image from among a larger collection, and be able to add a corresponding metadata tag to those images. The user can be prompted for the name of the metadata tag via a text entry box, and the metadata tag can be added into the metadata database and/or into the image files themselves.

B. Different Image Capture Devices and/or Image Types

The digital images in the source image database may have been captured by different image capture devices, and/or they maybe of different file types. Each of the foregoing may record different types of metadata, or the metadata so recorded may be in a different format.

Many different kinds of recorded metadata are nevertheless correlated with one another and can be converted to an equivalent basis for comparison, and/or otherwise considered members of the same family.

As an example of the former, a digital camera for the American market may record effective film speeds in American Standards Association (ASA) terms, while a camera for the European market may record in Deutsche Industrie Norm (DIN) terms. The scales are different (e.g., ASA is linear, while DIN is logarithmic), but can be directly converted to one another (e.g., ASA 64=DIN 8 and ASA 400=DIN 20). Similarly, one camera manufacturer's "intensity" metadata might correspond to another's "brightness" metadata.

As an example of the latter, one camera might have "red eye" correction, while another might have a "flash fill" feature. Although these are different, both are examples of custom flash settings, and could be assigned to a generic "custom flash" metadata field upon populating the metadata database. Metadata subtypes within the generic "custom flash" field would then include "flash fill" vs. "red eye." The generic metadata fields would then also become usable for high level querying when searching for images, and the metadata subtypes would be usable for further refining the search results thus returned. In this manner, iterative searching can be implemented within a category of metadata types.

V. An Exemplary System and Operating Environment

The embodiments described herein may be implemented in an operating environment comprising software installed on a computer, in hardware, in firmware, or in a combination thereof.

The software and/or hardware would typically include some type of computer-readable media which can store data and logic instructions that are accessible by the computer or the processing logic within the hardware. Such media might include, without limitation, hard disks, floppy disks, flash memory cards, digital video disks, random access memories (RAMs), read only memories (ROMs), and the like.

VI. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements thereof. Such identifiers are merely provided for convenience in reading, and should not necessarily be construed as requiring or implying a particular order of steps, or a particular sequential relationship among the claim elements.

What is claimed is:

1. A digital image search and retrieval system, comprising:
a query parser for parsing a query submitted by a user through a client computer, said query including at least one metadata criterion relating to a first type of recorded metadata and said query is void of any reference to a second type of recorded metadata different than the first type of recorded metadata;
said query parser having access to a metadata database for searching the metadata database for one or more digital images satisfying said metadata criterion; and
a response composer communicatively coupled to the query parser for receiving from the parser a notification of metadata results responsive to the query;
said response composer having access to the metadata database and a digital image database storing images identified by metadata stored in the metadata database wherein the response composer composes a response including one or more digital images from said digital image database corresponding to the metadata results from the query, the metadata for these images which corresponds to the first type of recorded metadata, and other metadata for these images which corresponds to the second type of recorded metadata, from said metadata database; and
said response composer being communicatively coupled to said client computer for sending the response to the client computer for display to said user.

2. The system of claim 1, wherein said query includes one or more types of metadata.

3. The system of claim 1, wherein said metadata database includes a corresponding entry for each digital image of a plurality of digital images.

4. The system of claim 3, wherein each said corresponding entry includes one or more metadata values for one or more types of metadata corresponding to each digital image.

5. The system of claim 1, wherein said metadata database is populated with metadata corresponding to a plurality of digital images.

6. The system of claim 5, wherein said digital image database is populated with image data of said plurality of digital images.

7. The system of claim 5, wherein at least some of said metadata include derived metadata calculated based on corresponding digital images.

8. The system of claim 5, wherein said metadata includes a generic metadata type, together with a plurality of different metadata subtypes belonging to said generic metadata type.

9. The system of claim 5, wherein at least some of said metadata for each corresponding digital image are extracted from a header of a digital image file of said digital image.

10. The system of claim 9, wherein said header is extracted in accordance with the EXIF standard.

11. The system of claim 1, wherein at least some of said metadata is recorded by an image capture device while capturing an image.

12. The system of claim 1, wherein at least some of said metadata are derived by an image processing technique operating on corresponding digital images.

13. The system of claim 1, wherein at least some of said metadata are converted from one format originally associated with said images to a different format not originally associated with said images.

14. The system of claim 1, wherein said corresponding metadata in said response includes recorded metadata specifically satisfying said metadata criterion, and the other metadata associated with said recorded metadata.

15. The system of claim 1, wherein the other metadata for these images comprises at least one user-specified metadata.

16. The system of claim 1, wherein the other metadata comprises at least one user-specified metadata.

17. A method for searching and retrieving digital images, comprising:
parsing a query obtained from a user through a client computer, said query including at least one metadata criterion relating to a type of recorded metadata;
searching a metadata database for one or more digital images satisfying said metadata criterion;
searching a digital image database for said one or more images;
composing a response including said one or more digital images identified by the at least one metadata criterion, metadata for these images which corresponds to the type of recorded metadata, and other metadata for these images not related to by the query; and enabling said client computer to render said response in accordance with a user preference of said user.

18. The method of claim 17, wherein said parsing includes: determining one or more types of metadata specified in said query.

19. The method of claim 17, wherein at least some of said metadata are recorded by an image capture device while capturing an image.

20. The method of claim 17, wherein at least some of said metadata are derived by an image processing technique operating on corresponding digital images.

21. The method of claim 17, further comprising:
obtaining another query from said client, said another query being refined based on said response; and
repeating said parsing, searching, composing, and enabling steps based on said another query.

22. The method of claim 17, wherein said metadata database is populated with metadata corresponding to a plurality of digital images.

23. The method of claim 22, wherein said image database is populated with image data of said plurality of digital images.

24. The method of claim 22, further comprising:
extracting said metadata for each corresponding digital image from a header of a digital image file of said digital image.

25. The method of claim 24, wherein said extracting includes parsing said header in accordance with the EXIF standard.

26. The method of claim 17, wherein one or more entries in said metadata database includes at least one generic metadata type encompassing a plurality of metadata subtypes.

27. The method of claim 17, wherein each digital image in said digital image database has a corresponding metadata entry in said metadata database.

28. The method of claim 17, wherein at least some of said metadata are converted from one format originally associated with their corresponding digital images to a different format not originally associated with said digital images.

29. The method of claim 17, wherein said corresponding metadata in said response include recorded metadata specifically satisfying said metadata criterion, and the other metadata associated with said recorded metadata.

30. The method of claim 17, wherein said searching a digital image database includes applying an indexing scheme based on corresponding file names of said one or more images.

31. The method of claim 17, wherein said enabling said client to render includes allowing said client to render any portion of said response.

32. The method of claim 17, wherein said metadata criterion includes a mathematical relation of attributes.

33. The method of claim 17, further comprising selecting said one or more digital images responsive to the metadata for these images, which corresponds to the type of recorded metadata related to by the at least one metadata criterion, satisfying the at least one metadata criterion, and wherein the other metadata for these images does not satisfy the at least one metadata criterion.

34. A computer-readable medium containing logic instructions for searching and retrieving digital images, executable to:
parse a query obtained from a user through a client computer, said query including at least one metadata criterion relating to a first type of recorded metadata;
search a metadata database for one or more digital images satisfying said metadata criterion;
search a digital image database for said one or more images;
compose a response including said one or more digital images, the first type of recorded metadata for these images responsive to the first type of recorded metadata for these images satisfying the at least one metadata criterion, and other metadata for these images which corresponds to a second type of recorded metadata which is not related to by the search query; and
enabling said client computer to render said response in accordance with a user preference of said user.

35. The computer-readable medium of claim 34, wherein said parse includes logic instructions executable to:
determine one or more types of metadata specified in said query.

36. The computer-readable medium of claim 34, further comprising logic instructions executable to:
obtain another query from said client, said another query being refined based on said response; and
repeat said logic instructions to parse, search, compose, and enable based on said another query.

37. The computer-readable medium of claim 34, wherein said metadata database is populated with metadata corresponding to a plurality of digital images.

38. The computer-readable medium of claim 34, further comprising logic instructions executable to:
extract said metadata for each corresponding digital image from a header of a digital image file of said digital image.

39. The computer-readable medium of claim 34, wherein:
said metadata database includes a generic metadata type encompassing a plurality of metadata subtypes.

40. The computer-readable medium of claim 34, wherein said metadata criterion includes a mathematical relation of attributes.

41. The computer-readable medium of claim 34, wherein the other metadata for these images included in the response does not satisfy the at least one metadata criterion.

* * * * *